April 13, 1965   E. A. PHILLIPS   3,178,044
TRANSPORTATION DEVICE
Filed Nov. 6, 1962   4 Sheets-Sheet 1
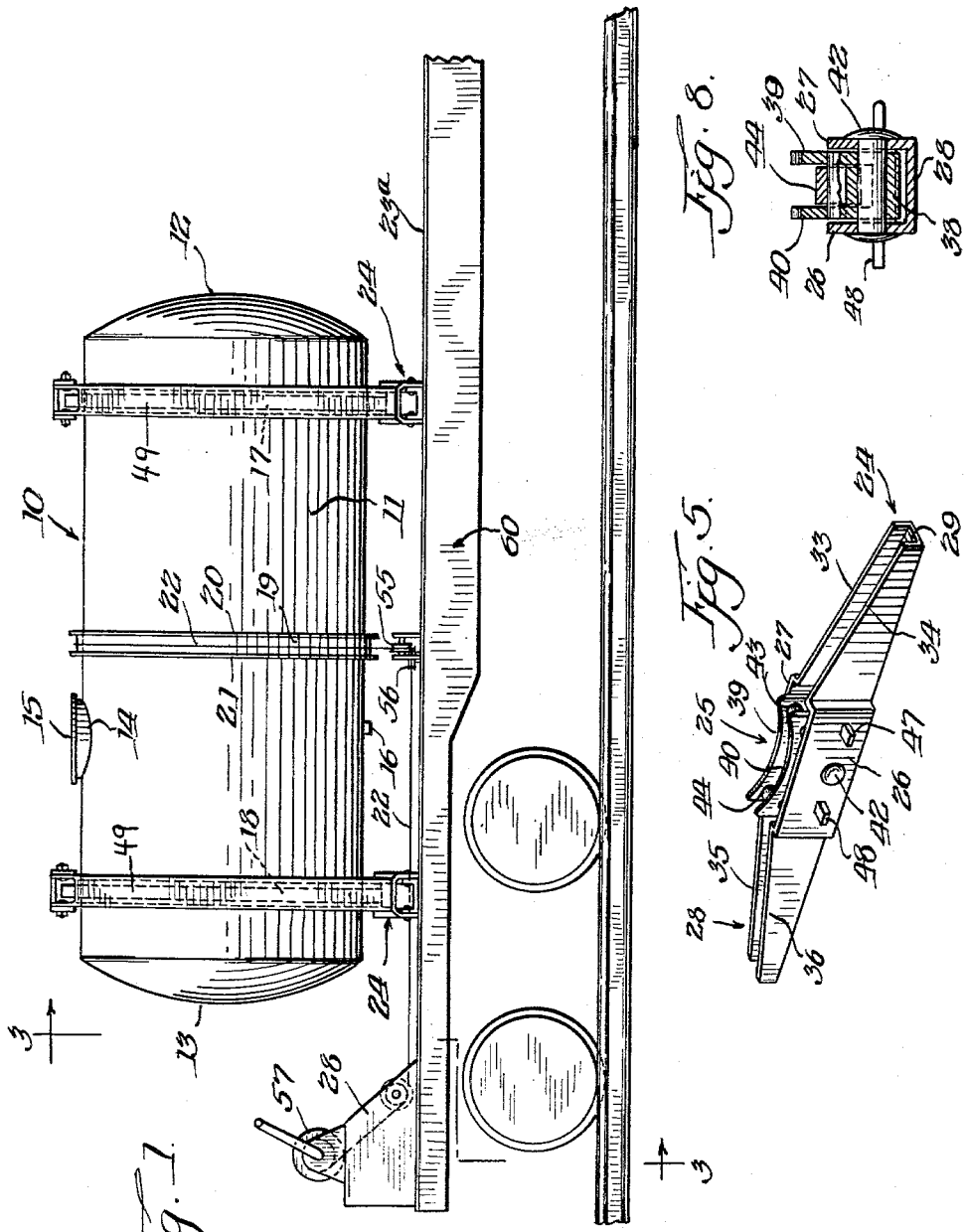
Inventor.
Earl A. Phillips
By Byrne Hume Grom & Clement
Attys.

April 13, 1965   E. A. PHILLIPS   3,178,044
TRANSPORTATION DEVICE
Filed Nov. 6, 1962   4 Sheets-Sheet 2
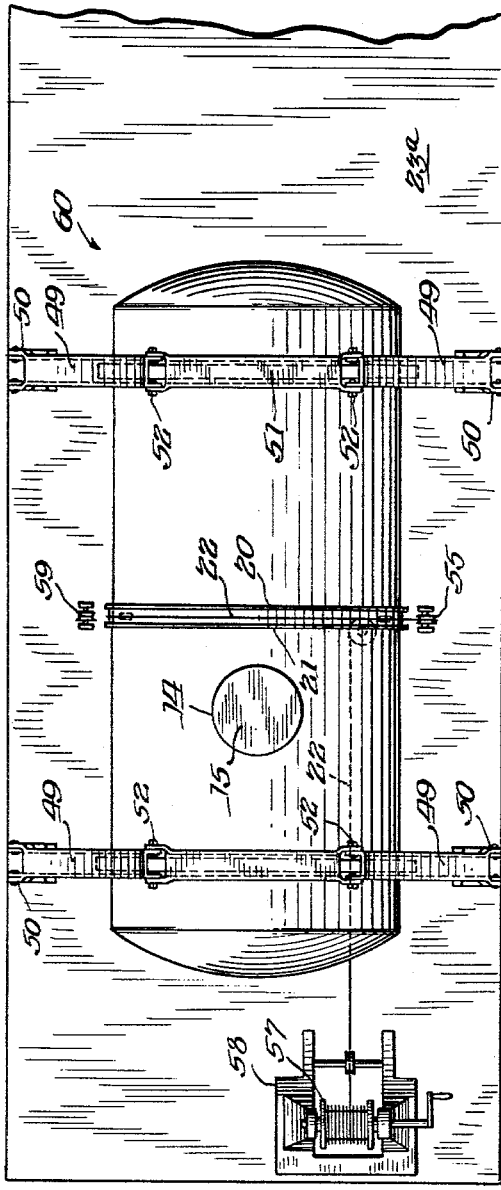
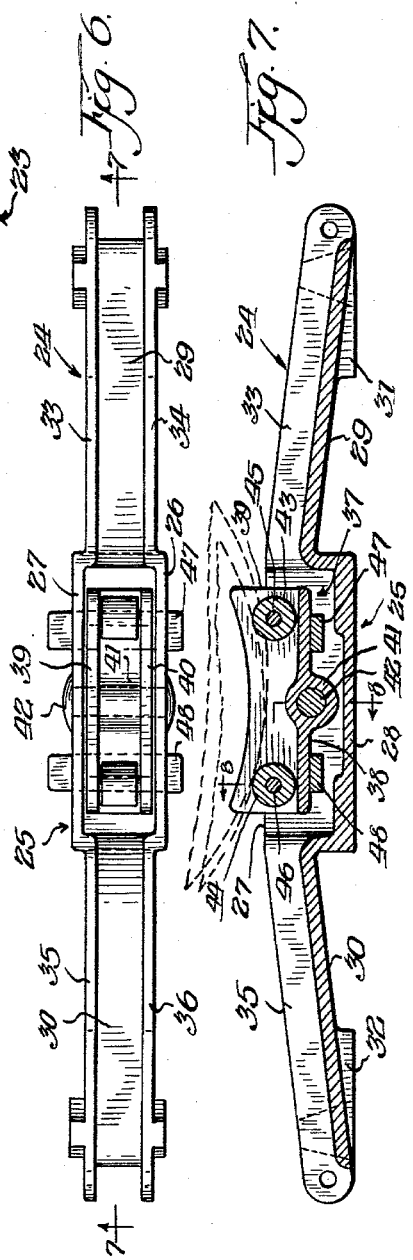
Inventor.
Earl A. Phillips.
By, Byron Hume Green & Clement
Attys.

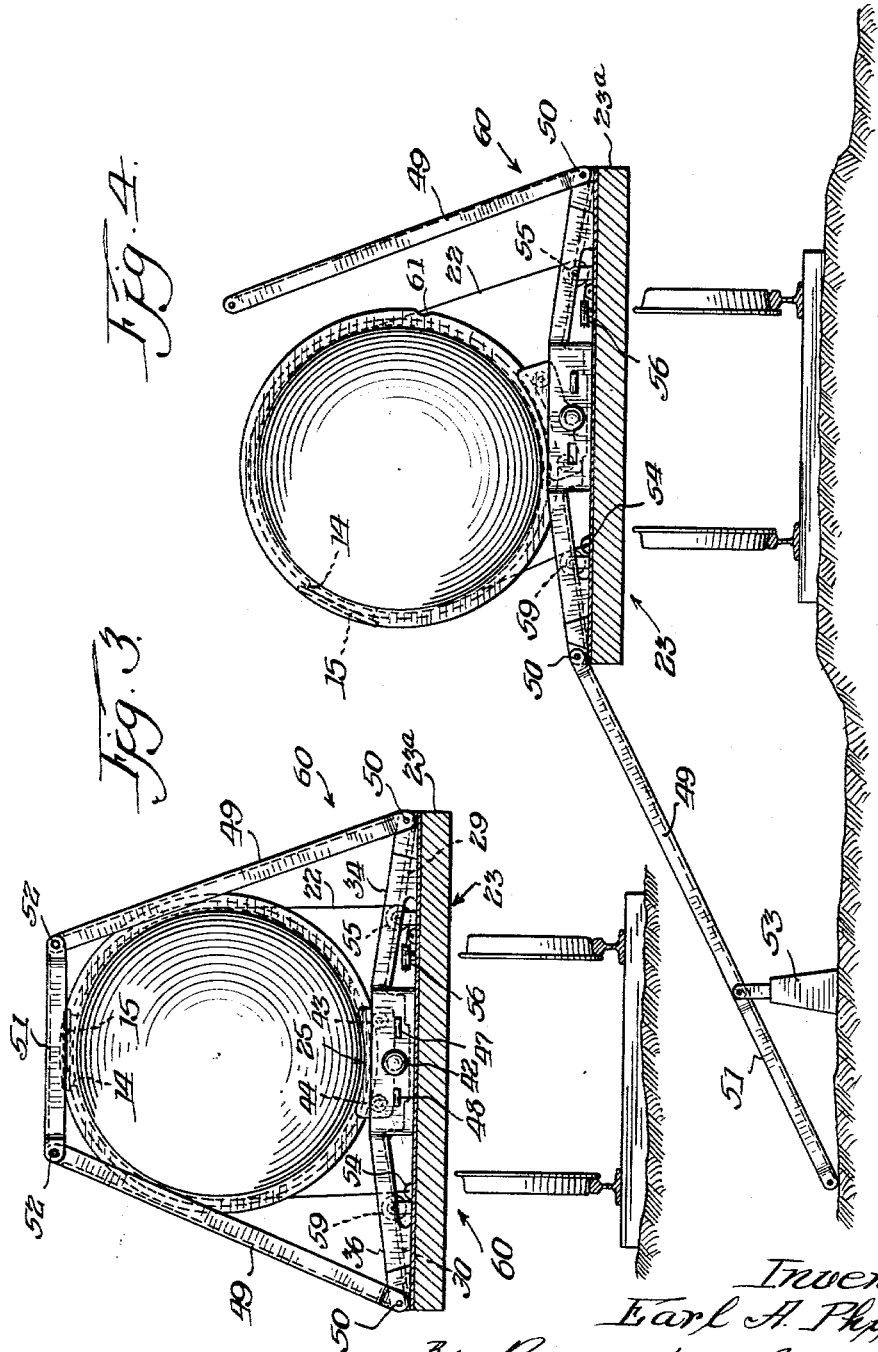

April 13, 1965 E. A. PHILLIPS 3,178,044
TRANSPORTATION DEVICE
Filed Nov. 6, 1962 4 Sheets-Sheet 4

Inventor
Earl A. Phillips
By Byron Hume Groen & Clement
Attys.

United States Patent Office 3,178,044
Patented Apr. 13, 1965

3,178,044
TRANSPORTATION DEVICE
Earl A. Phillips, La Grange Park, Ill., assignor to Union Tank Car Company, Chicago, Ill., a corporation of New Jersey
Filed Nov. 6, 1962, Ser. No. 235,713
5 Claims. (Cl. 214—85.1)

The present invention relates to apparatus for handling material and, in particular, relates to apparatus which forms a part of a system for the handling and transporting of materials in both liquid and dry form in containers carried upon vehicles.

It is an object of the present invention to provide a new and improved system for handling and transporting materials stored in liquid or dry form in containers.

It is another object of the present invention to provide an arrangement for transporting a container on a platform and for loading and unloading such container on and from the platform.

It is a further object of the present invention to provide a device that fixedly secures a container or the like to a platform during transportation and, alternatively, that effects the unloading of the container from the platform after the point of destination is reached.

It is another object of the present invention to provide a system of handling materials which preferably includes the use of cylindrical containers which can be rolled onto vehicles having flat beds, such as railway flatcars, trucks, decks of barges, and the like, and anchored thereon while being transported on such vehicles, the system functioning in one condition to provide means for rolling such containers into position upon the vehicles as well as unloading them when they are to be removed from the vehicles used for transporting purposes, and in another condition to hold such containers in place on the vehicles while being transported.

It is yet a further object of the present invention to provide an arrangement for the handling and transporting of materials in containers which, insofar as capacity is concerned, fall somewhat between tank cars used for transporting various materials in large unit form and drums which are small and handled and transported in individual sizes on trucks, railway cars and the like.

It is still another object of my invention to provide a means for transporting various kinds of commodities in large quantities in containers, preferably cylindrical in form, which can be filled with various commodities in liquid and dry form and sealed therein, which containers can be rolled upon the beds of flat cars, trucks, barges, and the like, and removed therefrom and placed for storage purposes in warehouses, platforms, or in yards as may be desired, thereby reducing the cost of charges incident to the storing of such materials in railway cars and paying storage and demurrage charges thereon.

These and other objects of the present invention will be more fully and better understood by reference to the accompanying drawings and in which:

FIG. 1 is an elevational view of a cylindrical container secured to a portion of a flat bed railway car by a transportation device embodying the features of the present invention;

FIG. 2 is a top plan view of the device of FIG. 1;

FIG. 3 is an end elevational view of the device of FIG. 1 in its supporting position;

FIG. 4 is an end elevational view of the device of FIG. 1 in one of its conveying positions;

FIG. 5 is a perspective view of a cradle and skid arrangement, embodied in the device of FIG. 1, for supporting the container in position upon the railway car;

FIG. 6 is an enlarged top view of the cradle and skid combination of FIG. 5;

FIG. 7 is a longitudinal sectional view taken along lines 7—7 of FIG. 6;

FIG. 8 is a sectional view taken along lines 8—8 of FIG. 7;

Figure 9:
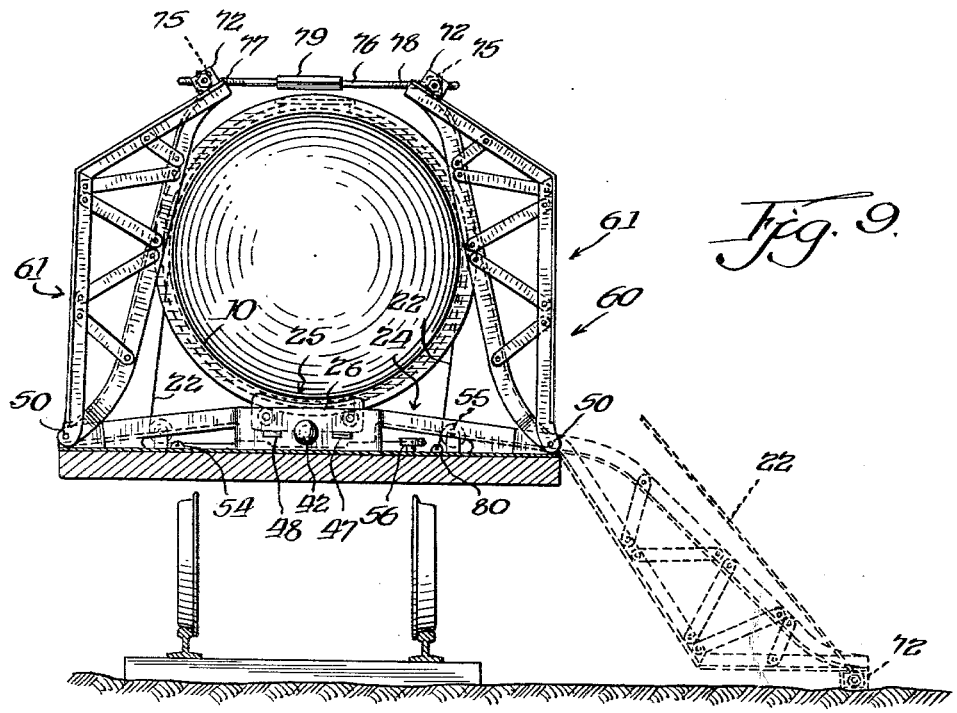
FIG. 9 is an elevational view similar to FIG. 1 of a modified form of the transportation device of FIG. 1, illustrating a portion of the device in phantom in its conveying position.

Referring now specifically to the drawings, in which like reference characters refer to like parts throughout, there is illustrated a container 10, preferably made of steel, aluminum, fiber glass, or of a plastic material. The container 10 has a circular wall portion 11 provided with ends 12 and 13 which may be welded or otherwise firmly fixed in sealed relation to the wall portion 11, thereby to provide a liquid holding container. A manway 14 is provided having a cover 15 which is tightly fitted into the manway to form a tight closure against leakage of liquid that may be carried by the container 10. An outlet pipe 16 for the container 10 is provided which is on the opposite side of the container to the manway 14 and may be used for emptying the container 10 when desired. Roll rings 17 and 18 are positioned circumferentially around the wall 11 adjacent each of its ends and, specifically, are welded or swaged to the wall 11 of the container 10 as illustrated in FIGS. 1 and 3. The rings 17 and 18 extend radially outwardly of the container 10 and include at their outer ends flat surfaces parallel with the wall 11. Hence, when the container 10 is horizontally oriented as shown in FIG. 1, the flat surfaces of the rings 17 and 18, and not the body of the container, engage a flat surface disposed beneath the container. Thus, the container 10 via its rings 17 and 18 rolls from place to place when transferred to and from a car, truck, or the like or when moved upon the ground, the floors of a loading platform, or the floor of a storage building. The container 10 also includes a cable ring 19 which extends circumferentially of its wall 11 intermediate the roll rings 17 and 18. The ring 19 has spaced side flanges 20, 21 which project outward from the base of the cable ring 19 to form a channel that accommodates a cable 22 of a transportation device 60. The transportation device 60 functions to load the container 10 on a flat car 23, to fixedly secure the container 10 on the flat car 23 during transit, and to unload the container 10 from the flat car 23 when at the point of destination. The device 60 is secured to the bed 23a of the flat car 23 and includes a pair of spaced support members 24, 24 mounted by suitable means to the bed 23a of the flat car 23. Each of said support members 24 comprises a cradle portion 25 having side walls 26 and 27 extending upwardly from a base portion 28 and, further, comprises skids 29 and 30 integrally formed with the cradle portion 25. Each of the skids 29 and 30 have base portions 31 and 32 on their underside near their outer ends, skid 29 having side wall portions 33 and 34 while skid 30 has side wall portions 35 and 36. As shown, the side walls 33, 34, 35, and 36 are spaced from each other a sufficient distance so that the roll rings 17 and 18 will be received therebetween.

The cradle portion 25 embodies a cradle block 37 having a bottom portion 38 and side walls 39 and 40, the bottom portion 38 having a trunnion 41 formed thereon. A pivot axle 42 is mounted in the trunnion 41 and its ends extend through and are supported by the side walls 26 and 27 of the cradle portion 25.

By this construction, the cradle block 37 rocks during the placing and removal of the container 10 on the cradle portion 25. Rollers 43 and 44 are mounted upon pins 45 and 46 which have their ends mounted in the side walls 39 and 40 of the cradle block 37. The rollers 43 and 44 engage the roll rings 17 and 18 and provide means by which the container 11 is rotatably supported upon the cradle block 37. The side walls 39 and 40 of the cradle block 37 are spaced from each other the same distance as are the walls 33 and 34 on the skid 29 and the walls 35 and 36 on the skid 30 so the roll rings 17 and 18 will pass therebetween. The upper ends of each of the side walls 39 and 40 of the cradle block 37 are arcuate in shape corresponding in curvature to the side wall 11 of the container 10 and so graduated in height as to extend above the rollers 43 and 44 but out of engagement with the side wall 11 of the container 10. The side walls 26 and 27 of the cradle portion 25 have two pairs of aligned openings therein within which stops 47 and 48 are normally inserted to hold the cradle block 37 in a fixed position and prevent its rocking. When the container 10 is being loaded, one of the stops 47 or 48 is removed so that the cradle block 37 may be tilted toward the container 10 as it is received thereon. When the container 10 is in its transit position, shown in FIG. 3, with the cradle block 37 returned to its normal supporting position (see FIGS. 3 and 7), either of the removed stops 47 or 48 is replaced and the cradle block 37 locked or latched in position. Conversely, when the container 10 is being unloaded, one of the stops 47 or 48 is removed and, because of the pivotal mounting of the cradle block 37, the container 10 is easily tilted off of the block 37 onto either of the skids 29 or 30 under the control of gravity.

Pivotally secured to each of the outer ends of each support member 24, are skids 49, 49 which are U-shaped in cross-section. Specifically, the skids 49 are bolted to the support member 24 by means of bolts 50, 50. A connecting member 51 is also pivotally bolted to the end of one of the skids 49 by bolt 52 so that when the container 10 is seated on the cradle portion 25, the free end of the connecting member 51 can be secured to the other skid 49. As a result, the container 10 is held in position upon the cradle block 37 and is fixedly secured to the bed 23a of the flat car 23.

The skids 49, 49 are also used for loading or unloading the container 10, as shown in FIG. 4 of the drawings. In this case, the members 51, 51 of each sub-assembly are released at one of their ends from their associated skids 49 and one of each pair of skids 49, 49 is lowered until the ends of the connecting members 51, 51 rest upon the ground, whereby there is formed a ramp over which the container 10 is rolled during its loading and unloading. There is provided support stands 53, 53 which are connected to the junctures of the skids 49, 49 and connecting members 51, 51. In this manner, the skids 49, 49 are supported as the container 10 is rolled thereover.

The container 10 is rolled to its loaded position upon the cradle block 37 by means of the cable 22, one end of which is anchored to an eye 54 secured to the bed 23 of the railway car. The body of the cable 22 extends upward and around the container 10 along the cable ring 19 formed by the spaced side flanges 20 and 21, passes around a vertically oriented idler pulley 55, then passes around a horizontal pulley 56 also mounted upon the bed 23a, under one of the support members 24 and to a winch 57 mounted in a frame 58 secured to the bed 23a of the railway car. The winch 57 is shown as manually actuated, but which in actual practice would probably be power operated by some form of motor, either electrical or hydraulic, both of which mechanisms are old and well known in the art. The cable 22 as shown is positioned to load or unload a container over the left side of the car, as viewed in FIG. 4. If it is desired, to load or unload the container 10 over the right side of the railway car bed 23a, the cable 22 could be threaded from the winch 57 around the pulley 56 (in a direction opposite to that above) and then around pulley 59 and the container 10 to an anchor (not shown) secured to the right side bed 23a of the car 23, as seen in FIG. 4.

The cable 22 may also be used for rotating the container 10 upon the cable block 37 by securing the free end of the cable to a pin or the like in the side of the cable ring 19 and thereafter using the winch 57 to roll the container 10 to a position where the manway 14 is at the top of the container and the outlet pipe 16 is at the bottom of the container, which position would be necessary for the filling and emptying of the container either with liquid or solid material. A recess 61 is shown in one of the roll rings which is so positioned that when the manway 14 is at the top of the container one of the rollers 43 or 44 engages the recess 61, whereby rotation of the container 10 upon the cradle block 37 is prevented.

In operation, as shown in FIGS. 1 and 2 of the drawings particularly, the container 10 is in anchored position upon the bed 23a of a flat car 23 for transit. In unloading the container 10 from the left side of the car 23, for example, the flat car 23 would, of course, be located in the desired position on the railway siding or the like. First, the bolts 52 are removed from the right ends of the connecting members 51 and the skids 49 on the right side of the car, as viewed in FIG. 3. Next, the skids 49, 49 are lowered into the position shown in FIG. 4 and the support stands 53 are placed in position to support the skids 49, 49 and connecting members 51. As a result, a continuous ramp is provided from the edge of the car to the ground or to a platform or to another vehicle.

After the skids 49 are placed in position, the next step is the removal of the stops 48 under the cradle blocks 37, which movement removes the support of the cradle blocks 37 on the left side and a very slight shift of the container 10 causes the cradle blocks 37 to assume the positions illustrated in FIG. 4. As illustrated, the rollers 43 are in alignment with the skids 30 so that a smooth transfer of the container 10 from the cradle blocks 37 onto the skids 30 is effected and the container 10 rolls in a counter-clockwise direction down the inclined skids 30 and onto the skids 49. Before the stops 48 are removed, the free end of the cable is attached to the eye 54 and the cable 22 kept taut by the winch as the container rolls onto the skids 30. Continued slackening of the cable 22 either through the use of a motor or a suitable braking mechanism enables the operator to control the speed with which the container 10 rolls down the skids 30, skids 49, and connecting members 51 and onto a loading platform or other vehicle.

After the container 10 is deposited at the proper position away from the car 23, the cable 22 is unhooked from the eye 54 and drawn around the winch 57. If the car 23 has a plurality of containers loaded on it either in end-to-end relation centrally of the car, or if the containers are smaller and placed in units in side-to-side relation to each other over the bed of the car, the operation would be the same as that heretofore described.

If the unloading operation were to take place on the opposite side of the car 23 from that described, the skids 49 would be lowered to form a ramp on the right side of the car 23. The cable 22 would be threaded around the container 10 in the opposite direction and when the ramp was in position and the workmen ready to remove the container, the stops 47 would be removed from under the cradle blocks 37 permitting the cradle blocks to tilt in a clockwise direction and the container 10 would roll by gravity over the skids 29 and down the ramp on the opposite side of the car onto a loading platform or other vehicle.

In loading the container 10 onto the bed of the car, the reverse operation occurs, i.e., the cable is pulled out from the winch 57, passed under and around the container 10, and its free end attached to the eye 54. Next, the container 10 is properly positioned so that the roll rings 17 and 18 are aligned with the ramps formed by the connecting members 51 and skids 49. Thereafter, the cable is wound upon the winch 57 and a rotary pulling force is exerted upon the container 10. Hence, the container rolls up the connecting members 51 and skids 49, skids 30 which have been placed previously in position as hereinabove described. The container 10 then rolls onto the skids 30 and thence the cradle blocks 37 which are tilted as a result of the stops 48 having been removed. Finally the container 10 is moved onto its transit position and the stop 48 replaced. Should it be desirable to rotate the container 10 on the cradle block 37, the cable 22 could be released from the eye 54 and secured to a pin or recess in the cable ring 19 and the winch 57 operated. With the container in the desired position, for example the manway located at the top of the container and the outlet 16 at the bottom, the skids 49 are moved upwardly and the free ends of the connecting members 51 secured to the opposite skids 49, thereby anchoring the container 10 securely in the cradle 37 upon the support members 25 mounted on the bed 23a of the flat car 23. It will be noted that the skids 49 when in vertical position converge toward each other toward their upper ends and engage the sides of the container above its center, so that, when the connecting members 51 are secured to the skids 49, an inward force is exerted upon the container 10, as well as a downward pressure to hold the container in firm position upon the cradle blocks 37 and restrain it against rotation. In addition, the container is restrained against axial movement because of the coaction of the roll rings 17 and 18 with the skids 49 and the coaction of the flat outer surfaces of the roll rings 17 and 18 with the side walls 39 and 40 of the cradle blocks 37. Thus, the container is firmly held in position against shocks which would be imparted to the container as the car 23 is transported in a train or in switching yards or the like.

If desired, of course, the containers could be loaded while in position upon the car with commodities somewhat on the order of an ordinary tank or hopper car, either with liquid or with dry material, without the removal of the container 10 from the car 23 or the truck.

Figure 10:
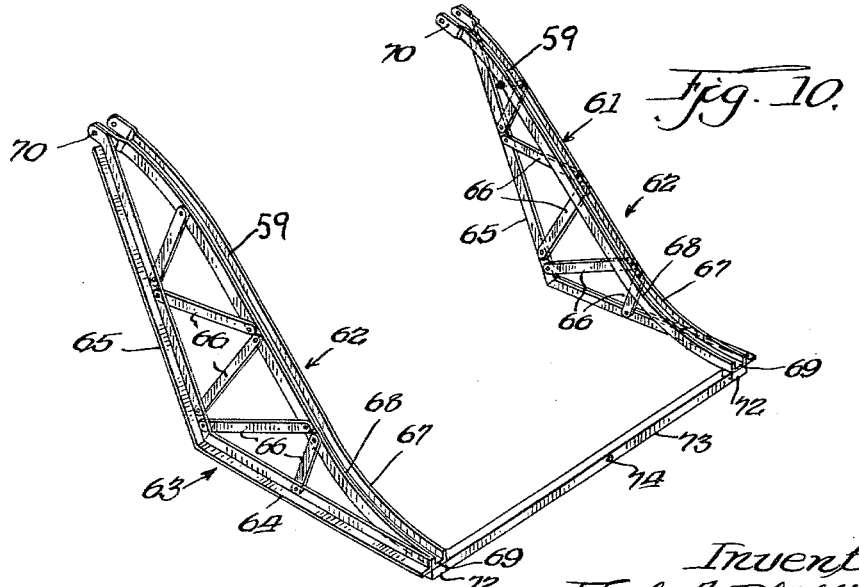
FIG. 10 is a perspective view of part of the device of FIG. 9.

A modified form of the transportation device is illustrated in FIGS. 9 and 10 and is generally identified by reference numeral 60. This modified form of the transportation device is identical to the transportation device 10 illustrated in FIGS. 1 through 8, with the exception that differently constructed skids are embodied in the FIG. 9 device.

Specifically, the device 60 embodies a pair of skid structures 61 as contrasted to the four individual skids 49 in the FIG. 1 device. Each of the skid structures embodies a pair of skid trusses 62 interconnected at their free ends by a bar 73 so that the trusses 62 move as a unit. Each of the trusses 62 includes an upper chord member 59 having a generally S shape connected at its ends to a lower chord member 63. The chord member 63 includes a first section 65 and a base section 64 and, as illustrated, the chord members 59 and 63 are interconnected at spaced apart points by struts 66. Similar to the skids 49, the chord members 62 are channel shaped and include spaced walls 67 and 68 interconnected by webs 69, which form a track for the roll rings 17 and 18 on the container 10. The side walls 67 and 68 act as guides for the roll rings 17 and 18 and prevent longitudinal movement of the container 10 as it rolls over the skids in the loading and unloading operation. In order to pivotally attach the skid structures 61 to the support members, the end of the skid trusses 62 (opposite the end which is secured to the bar 73) is suitably apertured, as indicated at 70, to accommodate bolts 50.

The bar 73 performs several functions. For example, it maintains the skid trusses 61 in predetermined spaced relation, it imports additional rigidity to the skid arrangement, it space relates the skid trusses 61 to the roll rings 17 and 18, it provides means whereby the skid trusses 61 may be raised and lowered as a unit by means of the cable and winch, an opening 74 being provided therein for attachment of the cable 22 for such purpose.

Blocks 75, 75 are suitably secured to pads 72 attached to the bar 73. The blocks 75 have internally threaded openings for receiving a connecting rod 76 having reversely threaded end portions 77 and 78 and a squared wrench engaging central section 79. By this construction, the skid structures 61 are drawn together in tight relation against the drum 10, so the container 10 is firmly held in position upon the cradle blocks 37, 37.

In FIG. 10 the cable 22 is shown as reversely threaded into the operating mechanism, i.e., its free end is secured to an eye 80 and extends upward over the container 10 down around the vertically positioned pulley 59, across to the horizontal pulley 56 and thence to the winch 57. Thus, as the cable 22 is slackened off, the skid structures 61, 61 are lowered to the position shown in dotted lines in FIG. 9 under control of the winch 57 and the container rolled in a clockwise direction off the support members 24 and onto the skid structures 61, 61.

While the forms described herein are considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. Apparatus for handling and transporting a container, said apparatus including a platform means, means secured to said platform means for supporting said container and including movable cradle means for facilitating movement of said container, said cradle means including a cradle and stop means for maintaining said cradle in selected position to receive and hold said container, and skid means movably secured to said supporting means, said skid means acting in one position to fixedly secure said container to said supporting means and in another position to provide a ramp for conveying said container onto and off of said supporting means and platform means.

2. Apparatus for handling and transporting material comprising in combination with a vehicle having a flat bed portion, container support members secured to the bed of the vehicle having channels in the faces thereof, a cylindrical container, roll rings extending circumferentially of the container, second channel support members forming a ramp over which the container is rolled in one position and encompassing the container in another position so as to be secured together at their ends, said roll rings being positioned in the channels in the support members whereby longitudinal movement of the container thereon is prevented, cable means associated with the said vehicle whereby the said container is rolled onto the said vehicle and also unloaded therefrom, cradle blocks in the second support members, axles on which the cradle blocks are pivotally supported mounted in the support members, and selectively removable support stops under each end of the said cradles supporting the cradles against rotation.

3. Apparatus for handling and transporting material comprising in combination with a vehicle having flat bed portion, container support members extending downwardly toward opposite sides of the bed of the vehicle and having channels in the faces thereof, a cylindrical container, roll rings extending circumferentially, skids pivotally mounted to the ends of the support members and having channels, said skids forming a ramp over which the container is rolled in one position and encompassing the container in another position to be secured together at their ends, said roll rings being positioned in the channels in the support member and the skids whereby longitudinal movement of the container thereon is prevented, cable means associated with said vehicle whereby the said container is rolled onto said vehicle and also unloaded therefrom, cradle blocks in the second support members, axles on which the cradle blocks are pivotally supported mounted in the support members, and selectively removable support stops in the said support members extending under the said cradle blocks at each of their ends.

4. Apparatus for handling and transporting material comprising in combination with a vehicle having a flat bed portion, means secured to said flat bed portion of said vehicle for supporting said container and including movable cradle means for facilitating movement of said container, said cradle means including a cradle and stop means for maintaining said cradle in selected position to receive and hold said container, and skid means movably secured to said supporting means, said skid means acting in one position to fixedly secure said container to said supporting means and in another position to provide a ramp for conveying said container onto and off of said supporting means."

5. Apparatus for transporting container structures, for maintaining said container structures in positive fixed relation during transit, and for effecting the loading and/or unloading of container structures prior and subsequent to transit thereof; which apparatus comprises platform means; means secured to said platform means for receiving and supporting a container structure; and ramp defining means pivotally secured to said supporting means so as to facilitate the positive positioning of a container structure on said supporting means and for facilitating the conveyance of a container structure onto and off of said supporting means, said ramp defining means including at least a pair of elongated skid members one each of which is pivotally secured on oppositely disposed sides of said platform means so that a container structure is located therebetween when positioned on said supporting means, said skid members being movable from a first position whereat said skid members partially encompass a container structure positioned on said supporting means to a second position whereat said skid members define a portion of a ramp for conveying a container structure onto and off of said supporting means, said ramp defining means also including an elongated extension arm and means for removably securing said elongated extension arm at the extremities thereof to the extremities of said skid members on each side of said supporting means when in said first position so that said extension arm encompasses the remaining portion of said container structure and maintains said container structure in fixed relation on said supporting means, said elongated extension arm being selectively joinable to only one of said skid members when in said second position so as to complete said ramp over which a container structure is conveyed.

References Cited by the Examiner

UNITED STATES PATENTS

| | | | |
|---|---|---|---|
| 1,226,483 | 5/17 | Duvall | 214—46.32 |
| 1,425,051 | 8/22 | Ramsay | 214—46.32 |
| 1,432,151 | 10/22 | Biggs | 214—38.32 |
| 1,452,608 | 4/23 | Kirst. | |
| 2,198,644 | 4/40 | Wettengel. | |
| 2,231,138 | 2/41 | Pugh | 214—64 |
| 2,765,938 | 10/56 | Diaddezio | 214—85.1 |
| 3,021,970 | 2/62 | Bigge et al. | 214—85.1 X |

FOREIGN PATENTS 35,342  6/12  Sweden.

HUGO O. SCHULZ, *Primary Examiner.*

GERALD M. FORLENZA, *Examiner.*